(12) United States Patent
Sakamoto et al.

(10) Patent No.: US 7,342,330 B2
(45) Date of Patent: Mar. 11, 2008

(54) HYBRID TYPE DOUBLE THREE-PHASE ELECTRIC ROTATING MACHINE

(75) Inventors: Masafumi Sakamoto, Kiryu (JP); Akira Tozune, Hitachi (JP)

(73) Assignee: Japan Servo Co., Ltd., Tokyo-to (JP)

( * ) Notice: Subject to any disclaimer, the term of this patent is extended or adjusted under 35 U.S.C. 154(b) by 207 days.

(21) Appl. No.: 11/241,919

(22) Filed: Oct. 4, 2005

(65) Prior Publication Data

US 2006/0071562 A1 Apr. 6, 2006

(30) Foreign Application Priority Data

Oct. 5, 2004 (JP) ............................. 2004-292681

(51) Int. Cl.
*H02K 37/14* (2006.01)

(52) U.S. Cl. .................................................. 310/49 R

(58) Field of Classification Search ............... 310/49 R
See application file for complete search history.

(56) References Cited

U.S. PATENT DOCUMENTS

| | | | | |
|---|---|---|---|---|
| 3,286,109 | A | * | 11/1966 | Madsen ...................... 310/49 R |
| 3,866,104 | A | * | 2/1975 | Heine .......................... 318/696 |
| 4,112,319 | A | * | 9/1978 | Field .......................... 310/49 R |
| 4,385,250 | A | * | 5/1983 | Welburn ..................... 310/162 |
| 4,675,564 | A | * | 6/1987 | Isozaki ...................... 310/49 R |
| 4,739,201 | A | * | 4/1988 | Brigham et al. .......... 310/49 R |
| 5,128,570 | A | * | 7/1992 | Isozaki ...................... 310/49 R |
| 5,289,064 | A | | 2/1994 | Sakamoto |
| 5,386,161 | A | | 1/1995 | Sakamoto |
| 5,410,200 | A | | 4/1995 | Sakamoto et al. |
| 5,477,120 | A | * | 12/1995 | Yoshimura et al. ......... 318/696 |
| 5,708,310 | A | * | 1/1998 | Sakamoto et al. ........ 310/49 R |
| 5,854,526 | A | | 12/1998 | Sakamoto |
| 5,874,795 | A | | 2/1999 | Sakamoto |
| 6,153,953 | A | | 11/2000 | Isozaki et al. |
| 6,160,330 | A | | 12/2000 | Sakamoto |

(Continued)

FOREIGN PATENT DOCUMENTS

JP 3537904 3/2004

OTHER PUBLICATIONS

U.S. Appl. No. 11/677,886, filed Feb. 22, 2007, Sakamoto et al.

*Primary Examiner*—Tran Nguyen
(74) *Attorney, Agent, or Firm*—Oblon, Spivak, McClelland, Maier & Neustadt, P.C.

(57) ABSTRACT

A stator core having twelve stator poles, coils wound around the stator poles, and a hybrid type rotor are included. The stator poles inwardly and radially extended from an annular yoke portion. Each of the respective stator poles has the same number of inductors. The coils are connected so that a pair of the stator poles being substantially symmetric with respect to a point are excited in opposite polarities. The rotor is arranged with a predetermined air gap with respect to the inductors, the rotor has a pair of rotor cores each of which has rotor teeth facing to the inductors and a permanent magnet magnetized in the axial direction sandwiched therebetween. The angles between inductors at the corresponding positions of adjacent stator poles are defined by repeating three sets of angular distributions each of which includes three times of 29.1 degrees and one time of 32.7 degrees when a number of rotor teeth equals 100.

5 Claims, 6 Drawing Sheets

U.S. PATENT DOCUMENTS

| | | |
|---|---|---|
| 6,259,176 B1 | 7/2001 | Isozaki et al. |
| 6,548,923 B2 * | 4/2003 | Ohnishi et al. ........... 310/49 R |
| 6,605,883 B2 | 8/2003 | Isozaki et al. |
| 6,674,187 B2 | 1/2004 | Isozaki et al. |
| 6,707,178 B2 | 3/2004 | Sakamoto et al. |
| 6,762,526 B2 | 7/2004 | Isozaki et al. |
| 6,812,611 B2 | 11/2004 | Ando et al. |
| 2006/0071562 A1 | 4/2006 | Sakamoto et al. |

* cited by examiner

US 7,342,330 B2

HYBRID TYPE DOUBLE THREE-PHASE ELECTRIC ROTATING MACHINE

BACKGROUND OF THE INVENTION

The present invention relates to an electric rotating machine such as a stepping motor used in OA (Office Automation) equipment or the like. Specifically, the present invention relates to a hybrid type double three-phase electric rotating machine.

An electric rotating machine such as a stepping motor that has a high positioning accuracy and low vibration is required in a use of OA equipment or the like. Japanese patent gazette No. 3537904 (JP 3537904B) discloses a double three-phase stepping motor that has two sets of three-phase coils. The motor is high in resolution, suitable for a use of positioning and low in cost.

FIG. 9 is a section view in a direction perpendicular to a rotation axis of the stepping motor shown in the patent gazette. The motor 2 disclosed in the patent gazette is provided with a stator 3 that has twelve stator poles 3b extended inwardly and radially from a cylindrical-shaped yoke portion 3a and a rotor 4 arranged inside the tip ends of the stator poles 3b with a predetermined air gap therebetween.

Five inductors (pole teeth) are formed on the tip end of each the stator pole 3b of the stator 3. Further, the angle formed between center lines of adjacent two stator poles is equal to $(30-\gamma)$ degrees or $(30+\gamma)$ degrees. Angle of $(30-\gamma)$ degrees and angle of $(30+\gamma)$ degrees are alternately repeated. An excitation coil is wound around each the stator pole. A coil A1 is wound around the stator pole at the center top in the drawing, and coils a1, B1, b1, C1, c1, A2, a2, B2, b2, C2 and c2 are wound around the stator poles in the order of clockwise from the next of the coil A1.

A pair of coils wound around the stator poles being substantially symmetric with respect to a point form one coil set for one phase. Three coil sets A1 and A2, B1 and B2, C1 and C2 form one group for three phases, and three coil sets a1 and a2, b1 and b2, c1 and c2 form the other group for three phases.

As shown in FIG. 10, the coils of the same phase are connected in series between terminals so that a pair of stator poles around which the coils of the same phase are wound are excited in the same polarity when a voltage is applied between terminals.

The rotor 4 is a popular hybrid type in which a pair of rotor cores sandwich a permanent magnet. The rotor 4 is fixed to a rotation shaft 5 that is supported by bearings (not shown). Rotor teeth are formed around the rotor cores. The pitch of the rotor teeth is corresponding to that of the inductors of the stator pole. The permanent magnet magnetizes the rotor teeth of one rotor core in N-pole and the rotor teeth of the other rotor core in S-pole. The rotor cores are arranged so that the rotor teeth thereof are deviated in angular position by ½ pitch of the rotor teeth.

FIG. 11 is a conceptual illustration that shows a relationship between the inductors of the stator and the rotor teeth. FIG. 11 shows the center inductors of the respective stator poles of the stator 3 and the rotor teeth that are closest to the respective inductors. Here, the deviations between the inductors of the stator poles and the rotor teeth are shown in electrical angle. When the center inductors of the stator poles around which the coils A1 and A2 are wound just face to the rotor teeth (N-pole) of the first rotor core without angular deviation, the center inductor of the next stator pole around which the coil a1 is wound is deviated by 30 degrees in electric angle with respect to the rotor tooth (N-pole) of the first rotor core, the center inductor of the next stator pole around which the coil B1 is wound is deviated by 60 degrees in electric angle with respect to the rotor tooth (S-pole) of the second rotor core, and the center inductor of the next next stator pole around which the coil b1 is wound is deviated by 90 degrees in electric angle with respect to the rotor tooth (S-pole) of the second rotor core. Assuming that the number of rotor teeth of each rotor core Nr equals 100, the stator poles are arranged so that the angle between adjacent poles becomes 29.1 degrees or 30.9 degrees that are alternately repeated.

Though the double three-phase stepping motor disclosed in the patent gazette has high resolution, cogging torque generated by the permanent magnet of the rotor when the coils are not excited becomes large, which causes large vibration and large noise under operation.

SUMMARY OF THE INVENTION

It is therefore an object of the present invention to provide a hybrid type complex three-phase electric rotating machine, which is capable of reducing cogging torque while keeping the resolution that is equal to the conventional double three-phase motor.

For the above object, according to the present invention, there is provided a hybrid type complex three-phase electric rotating machine, which includes:

a stator core that is provided with twelve or twenty-four stator poles radially extended from a fixed portion, each of the respective stator poles having the same number of inductors at the tip ends thereof;

a plurality of coils that are wound around the respective stator poles, the coils being connected so that a pair of the stator poles being substantially symmetric with respect to a point are excited in opposite polarities when the number of the stator poles is twelve, or so that four stator poles arranged at every about 90 degrees are alternately excited in opposite polarities in the circumferential direction when the number of the stator poles is twenty-four; and a rotor that is arranged with a predetermined air gap with respect to the inductors, the rotor having a pair of rotor cores each of which has rotor teeth facing to the inductors and a permanent magnet magnetized in the axial direction that is sandwiched between the rotor cores, the rotor cores being arranged to be deviated in angular position by ½ the pitch of the rotor teeth.

Further, an angle $\beta/m$ formed between an inductor of any one stator pole and an inductor at the corresponding position of the next stator pole, and an angle $\alpha/m$ formed between an inductor of any one stator pole and an inductor at the corresponding position of the next but one stator pole satisfy the following equations:

$$(360n \pm 60)/Nr = \alpha/m \quad (1)$$

$$(360k \pm 30)/Nr = \beta/m \quad (2)$$

where m=1 for the twelve pole type, m=2 for the twenty-four pole type, Nr is a number of the rotor teeth of the rotor core, and n and k are positive integers.

With this construction, since the coils of the same phase are excited in opposite polarities in the twelve or twenty-four poles, the cogging torque is reduced, which can reduce a vibration and a noise under operation as compared with the prior art. That's because the conventional stepping motor generates cogging torque of harmonics whose orders are multiples of three (it is referred to as 3-multiple harmonics), while the electric rotating machine of the present invention generates cogging torque of 12-multiple harmonics. Since the cogging torque becomes smaller as the order of harmonic increases in general, the electric rotating machine of the present invention can reduce the cogging torque to about ¼ level of that of the conventional stepping motor.

Further, it is preferable that the number Nr of the rotor teeth of the rotor core can divide 30 (30/Nr is an integer or a finite decimal). When the condition is satisfied, the step angle can be divided by a sexagesimal angle, which improves the usability of the motor.

As a specific example, for the twelve-pole type (m=1), the angles between inductors at the corresponding positions of adjacent stator poles are defined by repeating three sets of angular distributions each of which includes three times of 29.1 degrees and one time of 32.7 degrees when Nr=100.

Further, for the twenty-four-pole type, the angles between inductors at the corresponding positions of adjacent stator poles are defined by repeating four sets of angular distributions each of which includes five times of 14.7 degrees and one time of 16.5 degrees when Nr=100.

When the above-described electric rotating machine is driven as a stepping motor, two coils wound around said stator poles being substantially symmetric with respect to a point in the twelve pole type, or four coils wound around said stator poles that are arranged at every about 90 degrees in the twenty-four pole type are connected in series or in parallel to form two three-phase coil groups.

When the two three-phase coil groups are driven in phase, the electric rotating machine is driven as a three-phase machine having a large step angle, which enables high speed rotation.

On the other hand, when one three-phase coil group and the other three-phase coil group are independently driven with a predetermined phase difference, the electric rotating machine is driven as a six-phase machine, which increases the resolution and reduces undesired rotation variations.

Therefore, a single motor delivers two kinds of functions according to the driving methods.

Further, the electric rotating machine of the present invention can be also used as a multi-pole brushless DC motor or an AC servo motor of low cogging torque when it is driven by a feedback control where a position and a speed of a rotor are detected to determine a coil current and an excitation timing.

DESCRIPTION OF THE ACCOMPANYING DRAWINGS

DESCRIPTION OF THE PREFERRED EMBODIMENTS

Figure 1:
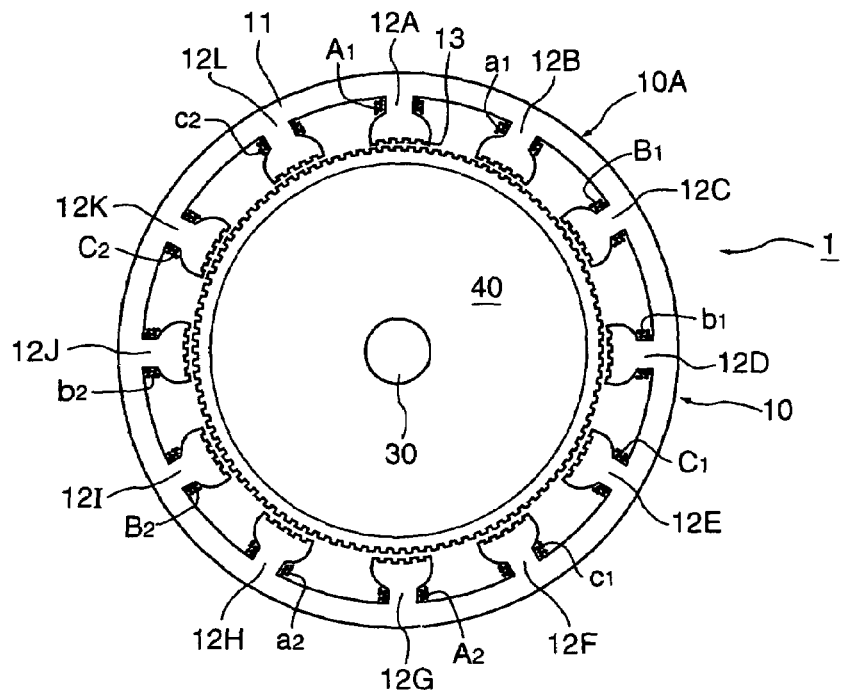
FIG. 1 is a section view of a hybrid type double three-phase stepping motor in a plane perpendicular to a rotation axis.
Figure 2:
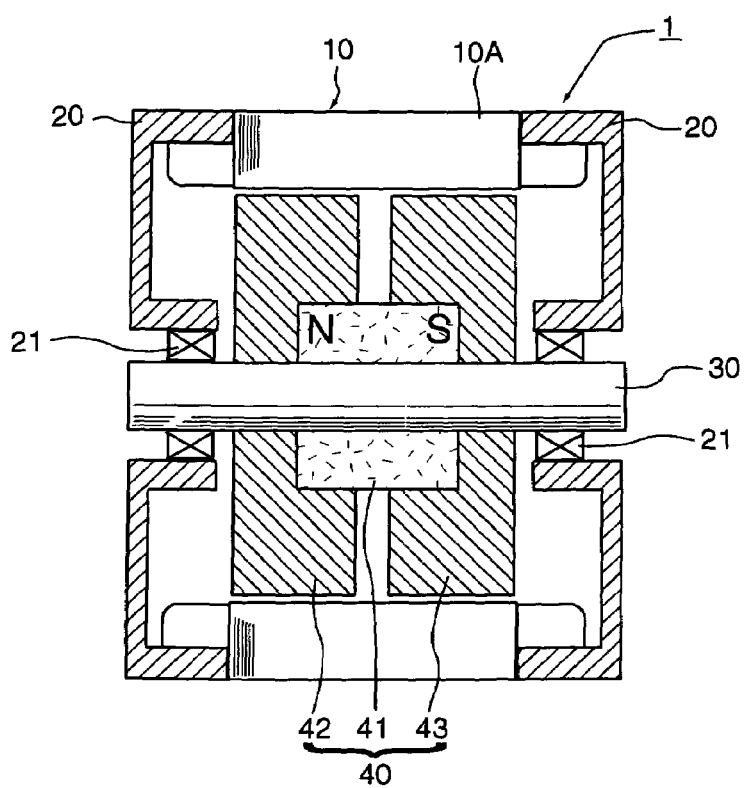
FIG. 2 is a sectional view of the stepping motor shown in FIG. 1 in a plane parallel to the rotation axis.
Figure 3:
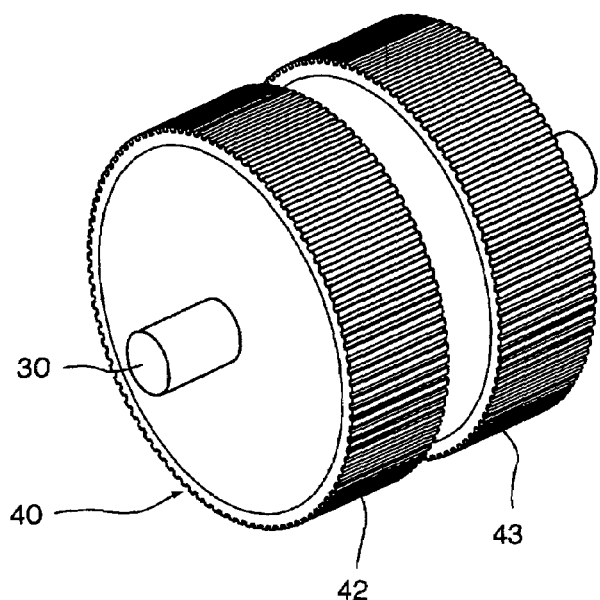
FIG. 3 is a perspective view of the rotor of the stepping motor shown in FIG. 1.

Hereinafter, a hybrid type double three-phase stepping motor will be described as an embodiment of the hybrid complex three-phase electric rotating machine of the present invention with reference to the drawings. FIG. 1 through FIG. 3 show a basic construction of the hybrid type double three-phase stepping motor, FIG. 1 is a section view in a plane perpendicular to the rotation axis, FIG. 2 is a section view in a plane parallel to the rotation axis, and FIG. 3 is a perspective view of a rotor.

The hybrid type double three-phase stepping motor 1 of the embodiment is an inner rotor type having twelve stator poles and is provided with a cylindrical-shaped stator 10, a pair of end brackets 20, 20 that are fixed to the both ends in the axial direction of the stator, a rotating shaft 30 that is rotatably supported by bearings 21, 21 mounted on the centers of the respective end brackets 20, 20, and a hybrid type rotor 40 fixed to the rotating shaft 30 to rotate with the shaft 30.

The stator 10 consists of a stator core 10A made from magnetic material that has an annular yoke portion 11 as a fixed portion and twelve stator poles 12A through 12L radially and inwardly extended from the yoke portion 11, and excitation coils A1, a1, B1, b1, C1, c1, A2, a2, B2, b2, C2, c2 that are wound around the bottom portion of the stator poles 12A through 12L, respectively. The tip end of each stator pole is formed widely and a constant odd number of inductors (pole teeth) 13 are formed thereon. For instance, five inductors are formed on every stator pole in the embodiment, three or seven inductors may be formed.

On the other hand, the rotor 40 is constructed by fixing a permanent magnet 41 and a pair of rotor cores 42 and 43 to the rotating shaft 30 so that the rotor cores 42 and 43 sandwich the permanent magnet 41. Rotor teeth are formed around the rotor cores 42 and 43. The pitch of the rotor teeth is corresponding to that of the inductors 13 of the stator poles. The rotor cores 42 and 43 are arranged so that the rotor teeth of the first rotor core 42 are deviated from that of the second rotor core 43 in angular position by ½ pitch of the rotor teeth. The permanent magnet 41 is magnetized in the axial direction and thereby, the first rotor core 42 is magnetized in N-pole and the second rotor core 43 is magnetized in S-pole.

The twelve coils wound around the stator poles form six coil sets. A pair of coils wound around the stator poles being substantially symmetric with respect to a point (a pair of coils wound around the stator poles at the positions about 180 degrees apart) form one coil set for one phase. Three coil sets A1 and A2, B1 and B2, C1 and C2 form one group for three phases, and three coil sets a1 and a2, b1 and b2, c1 and c2 form the other group for three phases. There are two groups of three-phase coil sets.

Figure 4:
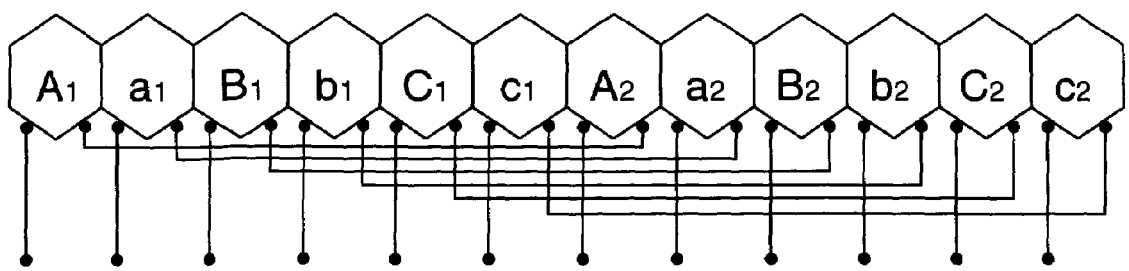
FIG. 4 is a wiring diagram of coils in the stepping motor shown in FIG. 1.

As shown in FIG. 4, the coils of the same phase are connected in series between terminals so that a pair of stator poles around which the coils of the same phase are wound are excited in opposite polarities when a voltage is applied between terminals.

Next, the arrangement of the stator poles of the hybrid type complex three-phase electric rotating machine of the present invention will be described.

Figure 5:
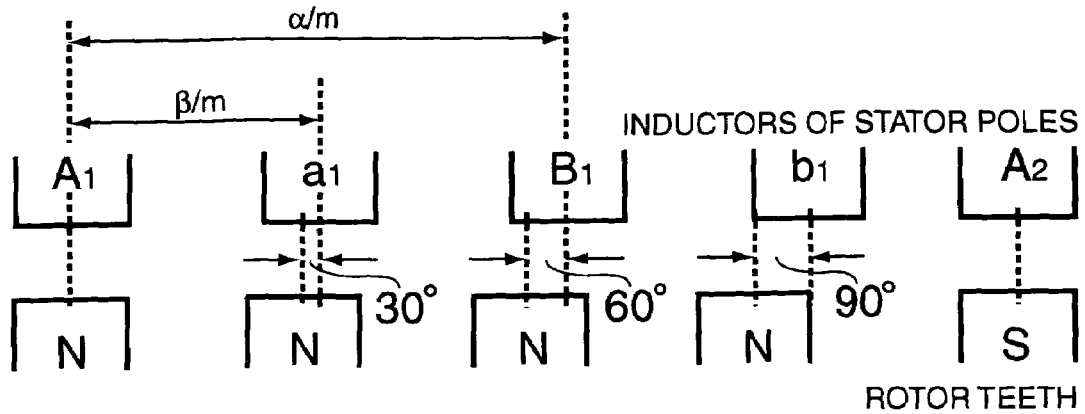
FIG. 5 is a conceptual illustration that shows a relationship between inductors of a stator and rotor teeth in the stepping motor shown in FIG. 1.

FIG. 5 is a conceptual illustration that shows a relationship between the inductors 13 of the stator 10 and the rotor teeth in the stepping motor of the embodiment. FIG. 5 shows the center inductors of the stator poles 12A, 12B, 12C, 12D, 12G and the rotor teeth that are closest to the respective inductors. Here, the deviations between the inductors of the stator poles and the rotor teeth are shown in electrical angle. When the center inductor of the stator pole 12A around which the coil A1 is wound just faces to the rotor tooth (N-pole) of the first rotor core 42 without angular deviation, the center inductor of the next stator pole 12B around which the coil a1 is wound is deviated by 30 degrees in electric angle with respect to the rotor tooth (N-pole) of the first rotor core 42, the center inductor of the next stator pole 12C around which the coil B1 is wound is deviated by 60 degrees in electric angle with respect to the rotor tooth (N-pole) of the first rotor core 42, the center inductor of the next stator pole 12D around which the coil b1 is wound is deviated by 90 degrees in electric angle with respect to the rotor tooth (N-pole) of the first rotor core 42. Then, the center inductor of the stator pole 12G around which the coil A2 is wound just faces to the rotor tooth (S-pole) of the second rotor core 43 without angular deviation.

An angle formed between an inductor of any one stator pole and an inductor at the corresponding position of the next stator pole is defined as $\beta/m$, and an angle formed between an inductor of any one stator pole and an inductor at the corresponding position of the next but one stator pole is defined as $\alpha/m$. Where m=1 for the twelve pole type, m=2 for the twenty-four pole type. Since the mechanical angle can be found by dividing the electric angle by the number Nr of rotor teeth of the rotor core, the following equations are obtained based on FIG. 5.

$$(360n \pm 60)/Nr = \alpha/m \quad (1)$$

$$(360k \pm 30)/Nr = \beta/m \quad (2)$$

Where n and k are positive integers.

Further, it is preferable that the number Nr of the rotor teeth can divide 30, that is, 30/Nr is an integer or a finite decimal. When the condition is satisfied, the step angle can be divided by a sexagesimal angle, which improves the usability of the motor.

Figure 6:
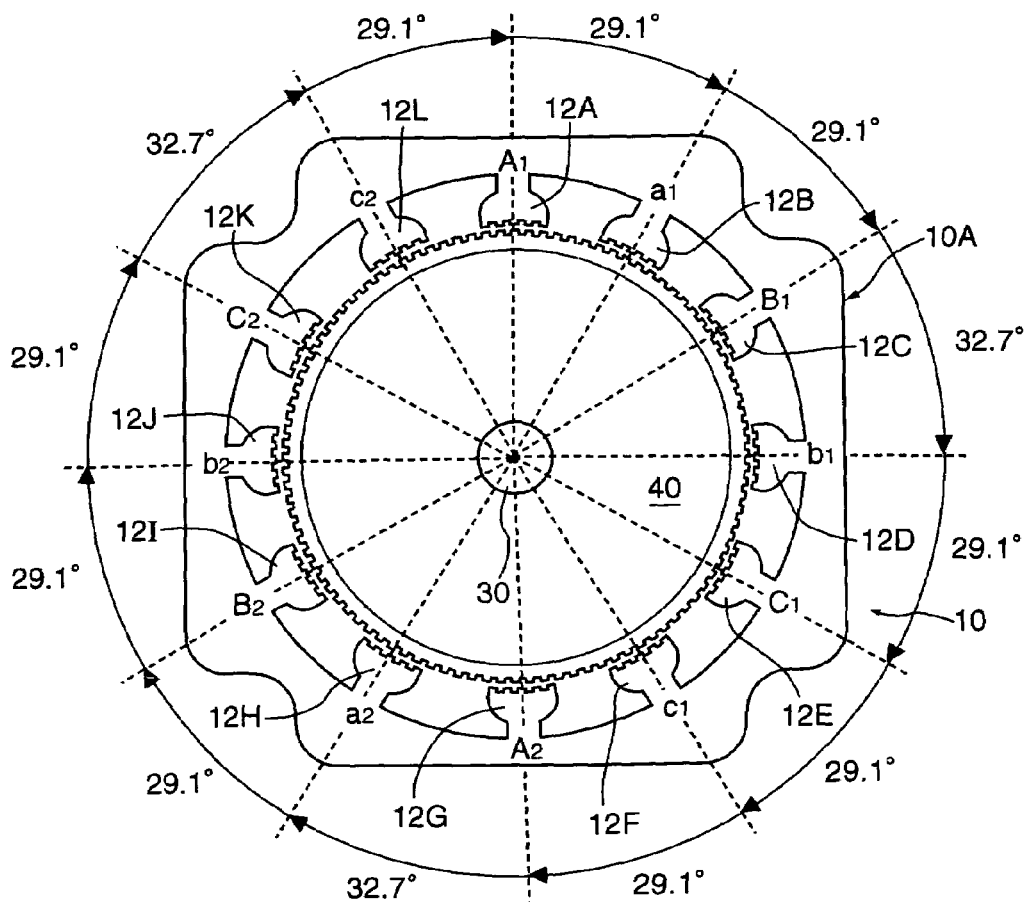
FIG. 6 shows a specific arrangement of stator poles in the stepping motor of the embodiment.

FIG. 6 shows a specific arrangement of the stator poles of the twelve poles type motor (m=1). The teeth number Nr is set at 100 that can divide 30. If the twelve stator poles are arranged at equal angular pitch, $\alpha/m=60$ degrees and $\beta/m=30$ degrees. When n=16 and k=8 are chosen so that $\alpha/m$ and $\beta/m$, which are results of the calculations by the equations (1) and (2), are close to 60 degrees and 30 degrees, respectively, the following angles are obtained.

$$\alpha/m = (360 \times 16 + 60)/100 = 58.2$$

$$\beta/m = (360 \times 8 + 30)/100 = 29.1$$

As shown in FIG. 6, the angles between inductors at the corresponding positions of adjacent stator poles are defined by repeating three sets of angular distributions each of which includes three times of 29.1 degrees and one time of 32.7 degrees when the stator core has twelve stator poles (m=1) and Nr=100.

On the other hand, for the twenty-four poles type (m=2), if the twenty-four stator poles are arranged at equal angular pitch, $\alpha/m=30$ degrees and $\beta/m=15$ degrees. When n=8 and k=4 are chosen so that $\alpha/m$ and $\beta/m$, which are results of the calculations by the equations (1) and (2), are close to 30 degrees and 15 degrees, respectively, the following angles are obtained.

$$\alpha/m = (360 \times 8 + 60)/100 = 29.4$$

$$\beta/m = (360 \times 4 + 30)/100 = 14.7$$

In this case, the angles between inductors at the corresponding positions of adjacent stator poles are defined by repeating four sets of angular distributions each of which includes five times of 29.1 degrees and one time of 16.5 degrees (90−14.7×5).

Further, when the stator poles are asymmetrically arranged as described in the embodiment, unevenness of the intervals between the adjacent stator poles may change the space factor of the coil, which may cause undesired torque variation. Therefore, it is desirable that the stator poles are symmetrically arranged at an equal pitch (30/m degrees) and the positions of the inductors vary to achieve the asymmetry that satisfies the equations (1) and (2).

Figure 7:
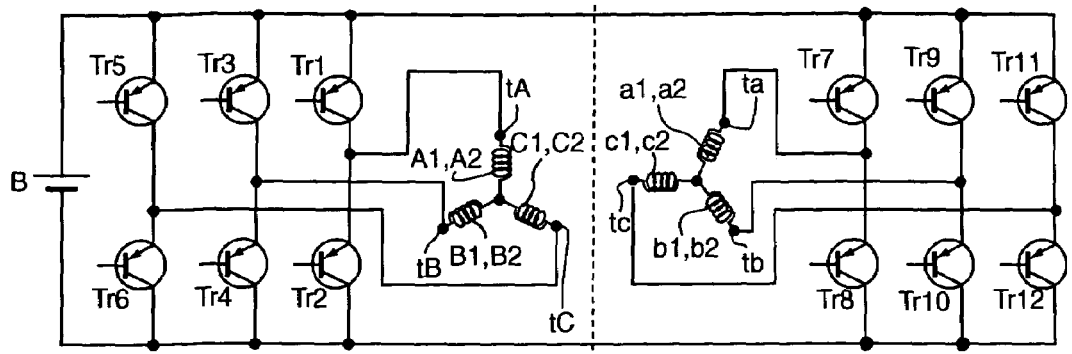
FIG. 7 shows a driving circuit for the stepping motor of the embodiment.

Next, a driving circuit for the hybrid type complex three-phase stepping motor will be described. FIG. 7 shows the coils of the twelve poles type stepping motor of the embodiment and the driving circuit thereof. A pair of coils of the same phase are connected in series to form a coil set and three coils sets, which constitute a coil group, are connected to form a star connection. The twelve coils are divided into the first and second groups.

The driving circuit consists of a battery B and two sets of bridge circuits each of which includes six switching transistors to supply or cut electricity from the battery B.

The coils A1 and A2, B1 and B2, C1 and C2 of the first group are connected in series, respectively, and one-side terminals of three coil sets are connected to one another to form a star connection. The other-side terminal tA of the coil set A1 and A2 is connected to the connection point of the switching transistors Tr1 and Tr2. The other-side terminal tB of the coil set B1 and B2 is connected to the connection point of the switching transistors Tr3 and Tr4, the other-side terminal tC of the coil set C1 and C2 is connected to the connection point of the switching transistors Tr5 and Tr6.

In the same manner, the coils a1 and a2, b1 and b2, c1 and c2 of the second group are connected in serial, respectively, and one-side terminals of three coil sets are connected to one another to form a star connection. The other-side terminal ta of the coil set a1 and a2 is connected to the connection point of the switching transistors Tr7 and Tr8. The other-side terminal tb of the coil set b1 and b2 is connected to the connection point of the switching transistors Tr9 and Tr10, the other-side terminal tc of the coil set c1 and c2 is connected to the connection point of the switching transistors Tr11 and Tr12.

When the coils are connected to form two star connections as described above, the six-phase bipolar driving circuit requires only twelve switching transistors. Since a six-phase bipolar driving circuit, which drives each phase independently, requires twenty-four switching transistors, the double star connection circuit can reduce the number of switching transistors half.

There are two driving methods to drive the hybrid type complex three-phase stepping motor of the embodiment that as twelve stator poles. When a high resolution is required, the coil sets A1 and A2, B1 and B2, C1 and C2 of the first group and the coil sets a1 and a2, b1 and b2, c1 and c2 of the second group are independently driven with a predetermined phase difference. This drives the stepping motor as a six-phase machine, which increases the resolution and reduces undesired rotation variations. A step angle becomes 30/Nr, for example, it is 0.3 degrees when Nr=100.

Figure 8:
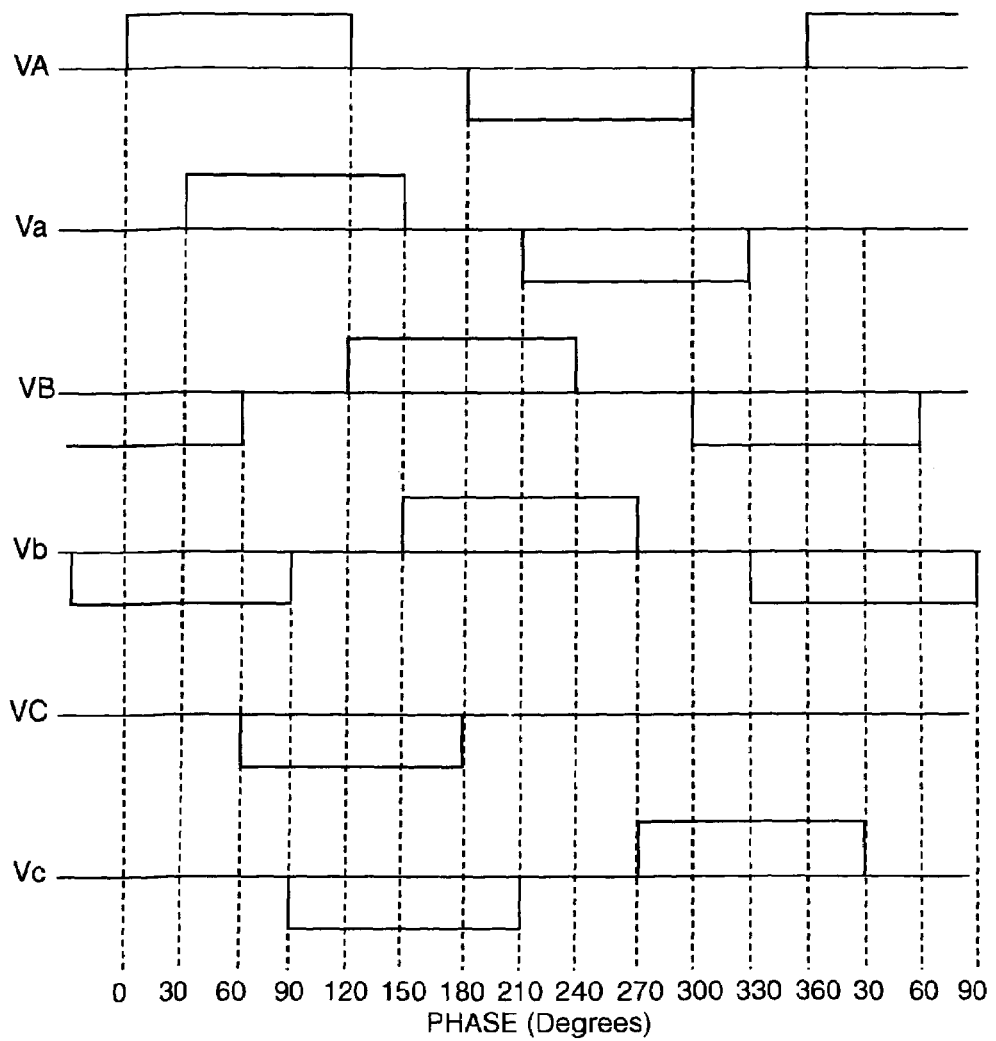
FIG. 8 shows waveforms of excitation voltages applied to the coils of the stepping motor of the embodiment.
Figure 9:
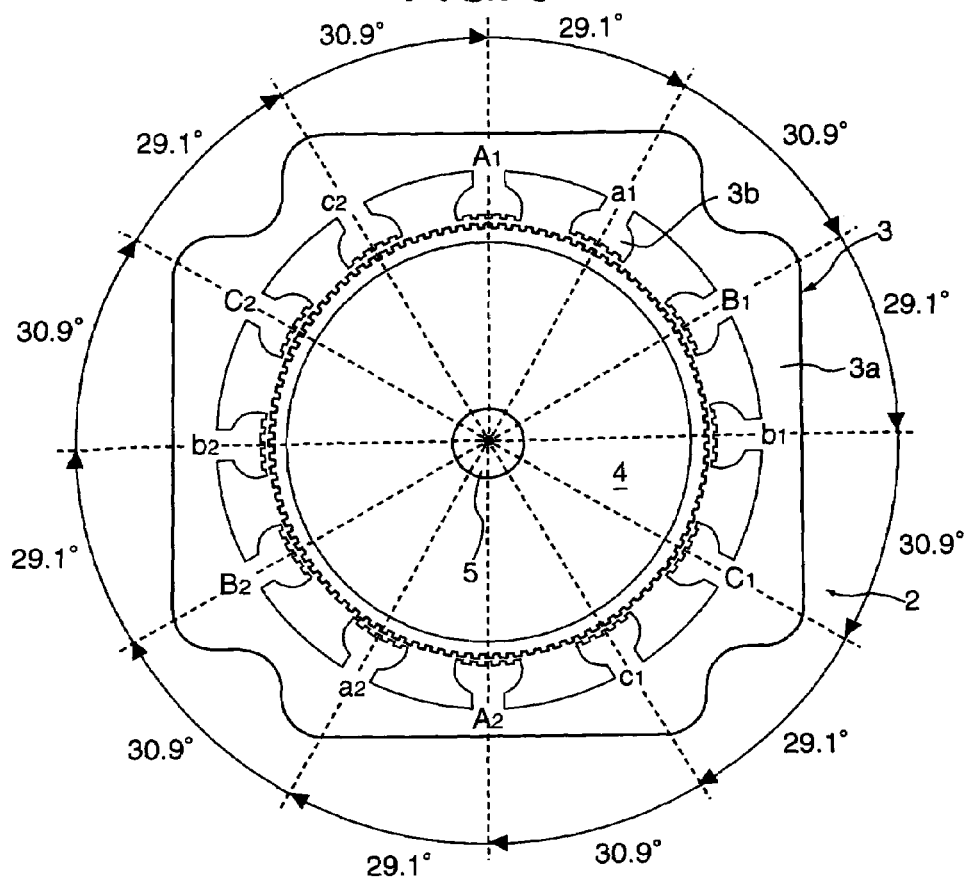
FIG. 9 shows a specific arrangement of stator poles in a conventional stepping motor.
Figure 10:
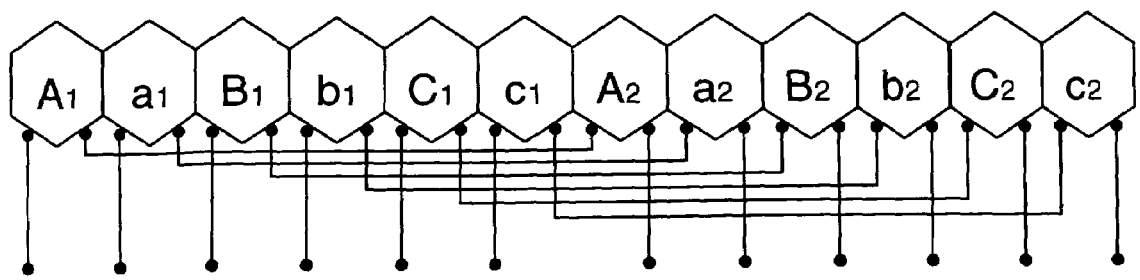
FIG. 10 is a wiring diagram of coils in the conventional stepping motor.

FIG. 8 shows waveforms of excitation voltages applied to the coils when the stepping motor of the embodiment is driven as a six-phase machine. In FIG. 8, references VA, Va, VB, Vb, VC, Vc represent excitation voltages applied to the input terminals tA, ta, tB, tb, tC, tc of the coil sets A1 and A2, B1 and B2, C1 and C2, a1 and a2, b1 and b2, c1 and c2, respectively. Further, phase differences are indicated assuming that one cycle of the excitation voltage VA from the leading edge thereof to the next leading edge is 360 degrees in FIG. 8.

As shown in FIG. 7 and FIG. 8, the phase difference between the excitation voltage VA applied to the terminal tA and the excitation voltage VB applied to the terminal tB is 120 degrees. The phase difference between the excitation voltages VB and VC is also 120 degrees. In the same manner, the phase differences between the excitation voltage Va and Vb, between the excitation voltages Vb and Vc are 120 degrees. The phase differences between the excitation voltages VA and Va, VB and Vb, VC and Vc are 30 degrees, respectively.

On the other hand, when a high speed rotation is required, the coil sets of three phases in the first group and the coil sets of three phases in the second group are excited in the same phase. That is, the coil set A1 and A2 in the first group is driven in phase with the coil set a1 and a2 in the second group, the coil set B1 and B2 is driven in phase with the coil set b1 and b2, and the coil set C1 and C2 is driven in phase with the coil set c1 and c2. This drives the stepping motor as a three-phase machine, which increases the rotating speed. The step angle becomes 60/Nr, for example, it is 0.6 degrees when Nr=100.

When the stepping motor is driven as a three-phase machine, the excitation voltages Va, Vb and Vc in FIG. 8 are in phase with the excitation voltages VA, VB and VC, respectively.

Next, a difference in cogging torque between the present invention and the prior art will be described.

Permeance P (Nrθ) with respect to one stator pole of a hybrid type stepping motor is logically expressed by odd harmonics only because the phases of permeance of one rotor core (N-pole) and the other rotor core (S-pole) are deviated by π to each other. However, since even harmonics may be included in actual due to a mechanical error or the like, the permeance P (Nrθ) of the stator pole 12A is expressed by the equation (3) and the cogging torque T (Nrθ) caused by the stator pole 12A is expressed by the equation (4).

$$P_{A1}(N_r\theta) = P_0(1 + k_1 \cos N_r\theta + k_2 \cos 2N_r\theta + k_3 \cos 3N_r\theta + \ldots) \quad (3)$$

$$T_{A1}(N_r\theta) = T_1 \sin N_r\theta + T_2 \sin 2N_r\theta + T_3 \sin 3N_r\theta + \ldots \quad (4)$$

Figure 11:
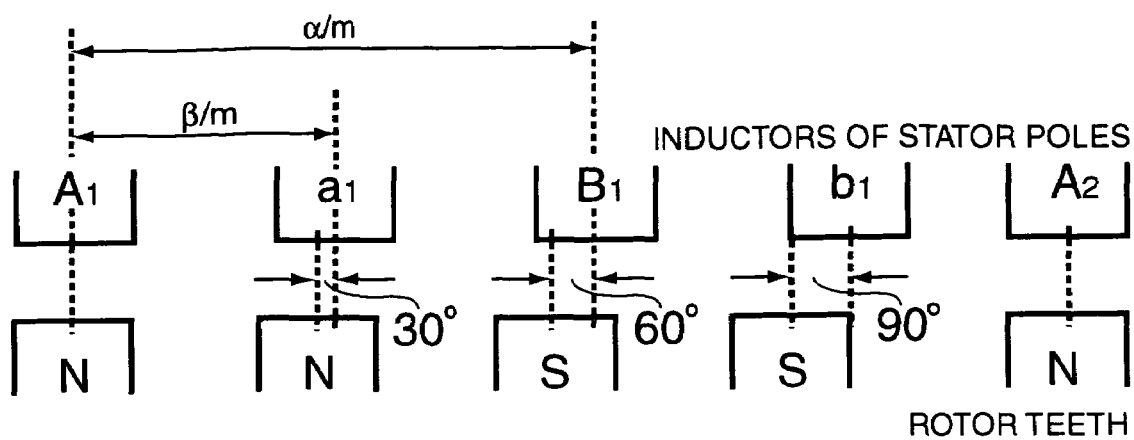
FIG. 11 is a conceptual illustration that shows a relationship between inductors of a stator and rotor teeth in the conventional stepping motor.

At this time, the total cogging torque T (Nrθ) caused by all the stator poles can be represented by the equation (5) with reference to FIG. 11.

$$T_{D1}(N_r\theta) = 2m\left\{T_{A1}\left(N_r\theta + T_{A1}\left(N_r\theta - \frac{1}{6}\pi\right) + T_{A1}\left(N_r\theta - \frac{4}{3}\pi\right) + T_{A1}\left(N_r\theta - \frac{3}{2}\pi\right) + T_{A1}\left(N_r\theta - \frac{2}{3}\pi\right) + T_{A1}\left(N_r\theta - \frac{5}{6}\pi\right)\right\} \quad (5)$$

$$= 2m\left[3\sqrt{2}\,T_3\sin\left(3N_r\theta - \frac{\pi}{4}\right) + 3\sqrt{2}\,T_9\sin\left(9N_r\theta + \frac{\pi}{4}\right) + 6T_{12}\sin 12N_r\theta + 3\sqrt{2}\,T_{15}\sin\left(15N_r\theta - \frac{\pi}{4}\right)\right]$$

The equation (5) shows that the conventional motor generates cogging torque of three-multiple harmonics except harmonics whose orders are odd multiples of six.

On the other hand, in the present invention, when the cogging torque caused by the stator pole 12A is expressed by the equation (4), the total cogging torque T(θ) caused by all the stator poles is expressed by the following equation (6) with reference to FIG. 5.

$$T_{D2}(N_r\theta) = m\left\{T_{A1}\left(N_r\theta + T_{A1}\left(N_r\theta - \frac{1}{6}\pi\right) + T_{A1}\left(N_r\theta - \frac{2}{6}\pi\right) + T_{A1}\left(N_r\theta - \frac{3}{6}\pi\right) + T_{A1}\left(N_r\theta - \frac{4}{6}\pi\right) + \cdots + T_{A1}\left(N_r\theta - \frac{11}{6}\pi\right)\right\} \quad (6)$$

$$= m(T_{12}\sin 12N_r\theta + T_{24}\sin 24N_r\theta + \cdots)$$

The equation (6) shows that the motor of the present invention generates the cogging torque of the 12-multiple harmonics only. Since the cogging torque becomes smaller as the order of harmonic increases in general, the electric rotating machine of the present invention has an advantage from the viewpoint of the cogging torque. A conventional hybrid type stepping motor changes the pitch of the inductors formed on the tip end of the stator pole form the pitch of the rotor teeth to form a so-called vernier pitch in order to reduce the cogging torque. On the other hand, the present invention can reduce the cogging torque without forming the vernier pitch.

The hybrid type complex three-phase electric rotating machine of the present invention is suitable to be used in OA equipment that requires low cogging torque.

What is claimed is:

1. A hybrid type complex three-phase electric rotating machine, comprising:
   a stator core that is provided with twelve or twenty-four stator poles radially extended from a fixed portion, each of said respective stator poles having a same number of inductors at the tip ends thereof;
   a plurality of coils that are wound around said respective stator poles, said coils being connected so that a pair of said stator poles being substantially symmetric with respect to a point are excited in opposite polarities when the number of said stator poles is twelve, or so that four stator poles arranged at every about 90 degrees are alternately excited in opposite polarities in the circumferential direction when the number of said stator poles is twenty-four; and
   a rotor that is arranged with a predetermined air gap with respect to said inductors, said rotor having a pair of rotor cores each of which has rotor teeth facing to said inductors and a permanent magnet magnetized in the axial direction that is sandwiched between said rotor cores, said rotor cores being arranged to be deviated in angular position by ½ the pitch of said rotor teeth,
   wherein an angle β/m formed between an inductor of any one stator pole and an inductor at the corresponding position of the next stator pole and an angle α/m formed between an inductor of any one stator pole and an inductor at the corresponding position of the second-to-next stator pole, satisfy the following equations:

$$(360n \pm 60)/Nr = \alpha/m \quad (1)$$

$$(360k \pm 30)/Nr = \beta/m \quad (2)$$

where m=1 for the twelve pole type, m=2 for the twenty-four pole type, Nr is a number of said rotor teeth of said rotor core, and n and k are positive integers.

2. The hybrid type complex three-phase electric rotating machine according to claim 1,
wherein said number Nr of said rotor teeth of said rotor core can divide 30.

3. The hybrid type complex three-phase electric rotating machine according to claim 2,
wherein the angles between inductors at the corresponding positions of adjacent stator poles are defined by repeating three sets of angular distributions each of which includes three times of 29.1 degrees and one time of 32.7 degrees when said stator core has twelve stator poles (m=1) and Nr=100.

4. The hybrid type complex three-phase electric rotating machine according to claim 1,
wherein two coils wound around said stator poles being substantially symmetric with respect to a point in the twelve pole type, or four coils wound around said stator poles that are arranged at every about 90 degrees in the twenty-four pole type are connected in series or in parallel to form two three-phase coil groups, and wherein said two three-phase coil groups are driven in phase.

5. The hybrid type complex three-phase electric rotating machine according to claim 1,
wherein two coils wound around said stator poles being substantially symmetric with respect to a point in the twelve pole type, or four coils wound around said stator poles that are arranged at every about 90 degrees in the twenty-four pole type are connected in series or in parallel to form two three-phase coil groups, and wherein said two three-phase coil groups are driven with a phase difference.

* * * * *